United States Patent
Phillips et al.

(10) Patent No.: US 7,980,984 B2
(45) Date of Patent: Jul. 19, 2011

(54) MULTI-SPEED TRANSMISSION

(75) Inventors: Andrew W. Phillips, Saline, MI (US);
Gregory Hukill, Clinton, MI (US);
James M. Hart, Belleville, MI (US);
Clinton E. Carey, Monroe, MI (US);
Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 616 days.

(21) Appl. No.: 12/108,894

(22) Filed: Apr. 24, 2008

(65) Prior Publication Data
US 2009/0054195 A1   Feb. 26, 2009

Related U.S. Application Data

(60) Provisional application No. 60/956,975, filed on Aug. 21, 2007.

(51) Int. Cl.
*F16H 3/62* (2006.01)

(52) U.S. Cl. .......................................... 475/275; 475/286

(58) Field of Classification Search .................. 475/271, 475/323
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 2004/0102278 A1* | 5/2004 | Usoro et al. | 475/275 |
| 2004/0102283 A1* | 5/2004 | Lee et al. | 475/286 |
| 2005/0090362 A1 | 4/2005 | Abe et al. | |
| 2006/0270513 A1 | 11/2006 | Klemen | |
| 2006/0270516 A1 | 11/2006 | Klemen | |

* cited by examiner

*Primary Examiner* — Edwin A Young

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and a brake.

15 Claims, 2 Drawing Sheets

| GEAR STATE | GEAR RATIO | RATIO STEP | TORQUE TRANSMITTING ELEMENTS ||||| 
|---|---|---|---|---|---|---|---|
| | | | 34 | 32 | 26 | 28 | 30 |
| REV | -5.594 | | X | | X | | |
| N | | -0.99 | | | | | |
| 1st | 5.624 | | X | | | X | |
| 2nd | 3.923 | 1.43 | X | X | | | |
| 3rd | 2.877 | 1.36 | X | | | | X |
| 4th | 2.010 | 1.43 | | X | | | X |
| 5th | 1.577 | 1.27 | | | | X | X |
| 6th | 1.319 | 1.19 | | | X | | X |
| 7th | 1.000 | 1.32 | | | X | X | |
| 8th | 0.763 | 1.31 | | X | X | | |

X = ON, CARRYING TORQUE

FIG. 3

MULTI-SPEED TRANSMISSION

CROSS-REFERENCE TO RELATED APPLICATIONS

This application claims the benefit of U.S. Provisional Application No. 60/956,975 filed on Aug. 21, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes an input member, an output member, first, second, third and fourth planetary gear sets each having first, second and third members, a first interconnecting member continuously interconnecting the first member of the first planetary gear set with a stationary element, a second interconnecting member continuously interconnecting the second member of the first planetary gear set with the third member of the second planetary gear set, a third interconnecting member continuously interconnecting the third member of the first planetary gear set with the second member of the third planetary gear set and the third member of the fourth planetary gear set, and a fourth interconnecting member continuously interconnecting the second member of the second planetary gear set with the third member of the third planetary gear set. Five torque transmitting mechanisms are selectively engageable to interconnect one of the first, second, and third members with at least one of the first, second, third members, and the stationary element. The torque transmitting mechanisms are selectively engageable in combinations of at least two to establish at least eight forward speed ratios and at least one reverse speed ratio between the input member and the output member.

In one aspect of the present invention, a first of the five torque transmitting mechanisms is selectively engageable to interconnect the first member of the second planetary gear set with at least one of the first member of the fourth planetary gear set and the input member.

In another aspect of the present invention, a second of the five torque transmitting mechanisms is selectively engageable to interconnect the first member of the second planetary gear set with at least one of the second member of the fourth planetary gear set and the output member.

In yet another aspect of the present invention, a third of the five torque transmitting mechanisms is selectively engageable to interconnect the first member of the third planetary gear set with at least one of the second member of the fourth planetary gear set and the output member.

In yet another aspect of the present invention, a fourth of the five torque transmitting mechanisms is selectively engageable to interconnect at least one of the second member of the first planetary gear set and the third member of the second planetary gear set with at least one of the second member of the second planetary gear set and the third member of the third planetary gear set.

In yet another aspect of the present invention, a fifth of the five torque transmitting mechanisms is selectively engageable to interconnect at least one of the second member of the second planetary gear set and the third member of the third planetary gear set with the stationary element.

In yet another aspect of the present invention, the first members are sun gears, the second members are carrier members, and the third members are ring gears.

In yet another aspect of the present invention, the input member is continuously interconnected with the first member of the fourth planetary gear set and wherein the output member is continuously interconnected with the second member of the fourth planetary gear set.

In yet another aspect of the present invention, one of the torque transmitting mechanisms is a brake and four of the torque transmitting mechanisms are clutches.

In yet another aspect of the present invention, the stationary element is a transmission housing.

Another embodiment of the transmission of the present invention includes an input member, an output member, first, second, third and fourth planetary gear sets each having first, second and third members, wherein the input member is continuously interconnected with the first member of the fourth planetary gear set and wherein the output member is continuously interconnected with the second member of the fourth planetary gear set, a first interconnecting member continuously interconnecting the first member of the first planetary gear set with a stationary element, a second interconnecting member continuously interconnecting the second member of the first planetary gear set with the third member of the second planetary gear set, a third interconnecting member continuously interconnecting the third member of the first planetary gear set with the second member of the third planetary gear set and the third member of the fourth planetary gear set, and a fourth interconnecting member continuously interconnecting the second member of the second planetary gear set with the third member of the third planetary gear set. A first torque transmitting mechanism is selectively engageable to interconnect the first member of the second planetary gear set with at least one of the first member of the fourth planetary gear set and the input member. A second torque transmitting mechanism is selectively engageable to interconnect the first member of the second planetary gear set with at least one of the second member of the fourth planetary gear set and the output member. A third torque transmitting mechanism is selectively engageable to interconnect the first member of the third planetary gear set with at least one of the second member of the fourth planetary gear set and the output member. A fourth torque transmitting mechanism is selectively engageable to interconnect at least one of the second member of the first planetary gear set and the third member of the second planetary gear set with at least one of the second member of the second planetary gear set and the third member of the third planetary gear set. A fifth torque transmitting mechanism is selectively engageable to interconnect at least one of the second member of the second planetary gear set and the third member of the third planetary gear set with the stationary element. The torque transmitting mechanisms are selectively engageable in combinations of at least two to establish at least eight forward speed ratios and at least one reverse speed ratio between the input member and the output member.

In one aspect of the present invention, the first members are sun gears, the second members are carrier members, and the third members are ring gears.

In another aspect of the present invention, the stationary element is a transmission housing.

Another embodiment of the transmission of the present invention includes an input member, an output member, first, second, third and fourth planetary gear sets each having a sun gear, a carrier member and a ring gear, wherein the input member is continuously interconnected with the sun gear of the fourth planetary gear set and wherein the output member is continuously interconnected with the carrier member of the fourth planetary gear set, a first interconnecting member continuously interconnecting the sun gear of the first planetary gear set with a stationary element, a second interconnecting member continuously interconnecting the carrier member of the first planetary gear set with the third member of the second planetary gear set, a third interconnecting member continuously interconnecting the ring gear of the first planetary gear set with the carrier member of the third planetary gear set and the ring gear of the fourth planetary gear set, and a fourth interconnecting member continuously interconnecting the carrier member of the second planetary gear set with the ring gear of the third planetary gear set. A first torque transmitting mechanism is selectively engageable to interconnect the sun gear of the second planetary gear set with at least one of the sun gear of the fourth planetary gear set and the input member. A second torque transmitting mechanism is selectively engageable to interconnect the sun gear of the second planetary gear set with at least one of the carrier member of the fourth planetary gear set and the output member. A third torque transmitting mechanism is selectively engageable to interconnect the sun gear of the third planetary gear set with at least one of the carrier member of the fourth planetary gear set and the output member. A fourth torque transmitting mechanism is selectively engageable to interconnect at least one of the carrier member of the first planetary gear set and the ring gear of the second planetary gear set with at least one of the carrier member of the second planetary gear set and the ring gear of the third planetary gear set. A fifth torque transmitting mechanism is selectively engageable to interconnect at least one of the carrier member of the second planetary gear set and the ring gear of the third planetary gear set with the stationary element. The torque transmitting mechanisms are selectively engageable in combinations of at least two to establish at least eight forward speed ratios and at least one reverse speed ratio between the input member and the output member.

In one aspect of the present invention, the stationary element is a transmission housing.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These mechanical connections generically link or relate the transmission embodiments. More specifically, a first component or element of a first planetary gear set is permanently coupled to a ground. A second component or element of the first planetary gear set is permanently coupled to a first component or element of a second planetary gear set. A third component or element of the first planetary gear set is permanently coupled to a second component or element of a third planetary gear set and also to a first component or element of a fourth planetary gear set. Finally, a second component or element of the second planetary gear set is permanently coupled to a first component or element of the third planetary gear set.

Figure 1:
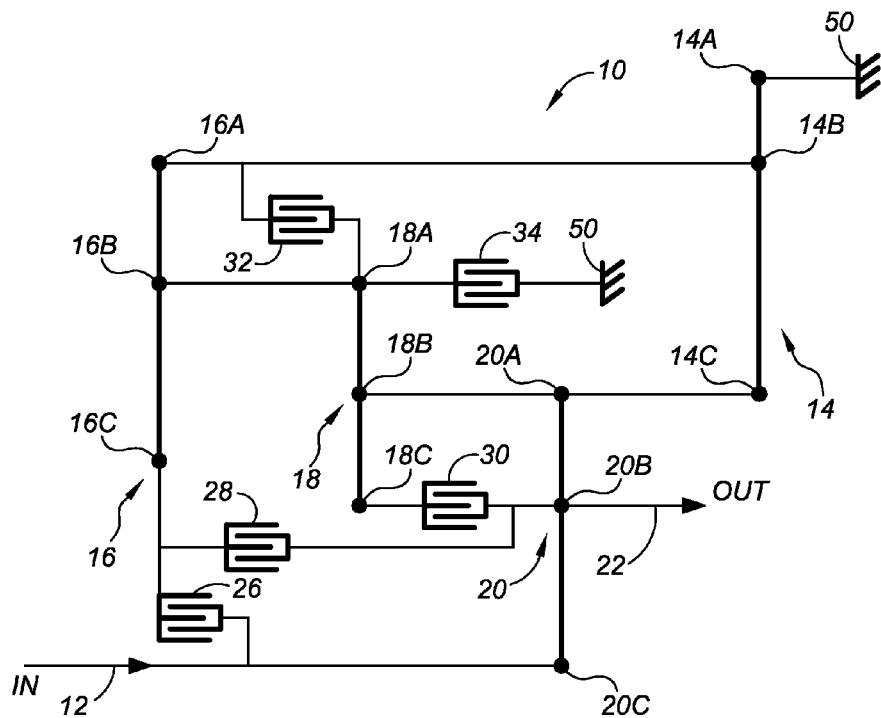
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the third node 20C of the fourth planetary gear set 20. The output member 22 is coupled to the second node 20B of the fourth planetary gear set 20. The first node 14A of the first planetary gear set 14 is coupled to a ground, stationary element or a transmission housing 50. The second node 14B of the first planetary gear set 14 is coupled to the first node 16A of the second planetary gear set 16. The third node 14C of the first planetary gear set 14 is coupled to the first node 20A of the fourth planetary gear set 20. The first node 20A of the fourth planetary gear set 20 is coupled to the second node 18B of the third planetary gear set. The second node 16B of the second planetary gear set 16 is coupled to the first node 18A of the third planetary gear set 18.

A first clutch 26 selectively connects the third node 16C of the second planetary gear set 16 with the third node 20C of the fourth planetary gear set 20 and with the input member 12. A second clutch 28 selectively connects the third node 16C of the second planetary gear set 16 with the second node 20B of the fourth planetary gear set 20. A third clutch 30 selectively connects the third node 18C of the third planetary gear set 18 with the second node 20B of the fourth planetary gear set 20 and the output member 22. A fourth clutch 32 selectively connects the second node 14B of the first planetary gear set 14 and the first node 16A of the second planetary gear set 16 with the first node 18A of the third planetary gear set 18 and the second node 16B of the second planetary gear set 16. A brake 34 selectively connects the first node 18A of the third planetary gear set 18 and the second node 16B of the second planetary gear set 16 with the stationary element or the transmission housing 50.

Figure 2:
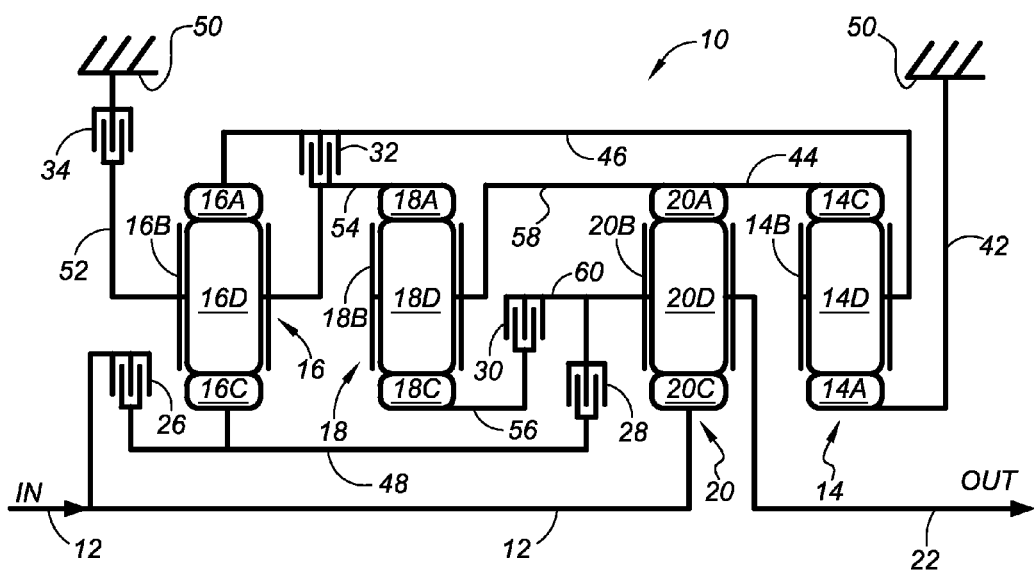
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). Planet gears 14D are each configured to intermesh with both the sun gear member 14A and the ring gear member 14C. The sun gear member 14A is connected to a stationary element or the transmission housing 50 by a first shaft or interconnecting member 42 in order to restrict the sun gear member 14A from rotating relative to the transmission housing 50. The ring gear member 14C is connected for common rotation with a second shaft or interconnecting member 44. The planet carrier member 14B is connected for common rotation with a third shaft or interconnecting member 46.

The planetary gear set 16 includes a sun gear member 16C, a ring gear member 16A and a planet gear carrier member 16B that rotatably supports a set of planet gears 16D (only one of which is shown). Planet gears 16D are each configured to intermesh with both the sun gear member 16C and the ring gear member 16A. The sun gear member 16C is connected for common rotation with a fourth shaft or interconnecting member 48. The ring gear member 16A is connected for common rotation with third shaft or interconnecting member 46. The planet carrier member 16B is connected for common rotation with a fifth shaft or interconnecting member 52 and a sixth shaft or interconnecting member 54.

The planetary gear set 18 includes a sun gear member 18C, a ring gear member 18A and a planet gear carrier member 18B that rotatably supports a set of planet gears 18D (only one of which is shown). Planet gears 18D are each configured to intermesh with both the sun gear member 18C and the ring gear member 18A. The sun gear member 18C is connected for common rotation with a seventh interconnecting member 56. The ring gear member 18A is connected for common rotation with sixth shaft or interconnecting member 54. The planet carrier member 18B is connected for common rotation with an eighth shaft or interconnecting member 58.

The planetary gear set 20 includes a sun gear member 20C, a ring gear member 20A and a planet gear carrier member 20B that rotatably supports a set of planet gears 20D (only one of which is shown). Planet gears 20D are each configured to intermesh with both the sun gear member 20C and the ring gear member 20A. The sun gear member 20C is connected for common rotation with the input shaft or member 12. The ring gear member 20A is connected for common rotation with second shaft or interconnecting member 44 and with eighth shaft or interconnecting member 58. The planet carrier member 20B is connected for common rotation with a ninth interconnecting shaft or member 60 and output shaft or member 22.

The input shaft or member 12 is preferably continuously connected to an engine (not shown) or to a turbine of a torque converter (not shown). The output shaft or member 22 is preferably continuously connected with a final drive unit or transfer case (not shown).

The torque transmitting mechanisms or clutches 26, 28, 30, 32 and brake 34 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the fourth shaft or interconnecting member 48 with the ninth shaft or interconnecting member 60. The third clutch 30 is selectively engageable to connect the seventh shaft or interconnecting member 56 with the ninth shaft or interconnecting member 60. The fourth clutch 32 is selectively engageable to connect the third shaft or interconnecting member 46 with the sixth shaft or interconnecting member 54. The brake 34 is selectively engageable to connect the fifth interconnecting shaft or member 52 with the stationary element, ground, or the transmission housing 50.

Referring now to FIGS. 2 and 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio with a single overdrive. Each forward and reverse speed or torque ratio is attained by engagement of one or more of the torque transmitting mechanisms (i.e. first clutch 26, second clutch 28, third clutch 30, fourth clutch 32 and brake 34), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 26 and brake 34 are engaged or activated. The first clutch 26 connects the input shaft or member 12 with the fourth shaft or interconnecting member 48. The brake 34 connects the fifth interconnecting member 52 with the stationary element or the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brake not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with a stationary element;
   a second interconnecting member continuously interconnecting the second member of the first planetary gear set with the third member of the second planetary gear set;
   a third interconnecting member continuously interconnecting the third member of the first planetary gear set with the second member of the third planetary gear set and the third member of the fourth planetary gear set;
   a fourth interconnecting member continuously interconnecting the second member of the second planetary gear set with the third member of the third planetary gear set; and
   five torque transmitting mechanisms each selectively engageable to interconnect at least one of the first, second, and third members with at least another one of the first members, second members, third members, and the stationary element, and
   wherein the torque transmitting mechanisms are selectively engageable in combinations of at least two to establish at least eight forward speed ratios and at least one reverse speed ratio between the input member and the output member.

2. The transmission of claim 1 wherein a first of the five torque transmitting mechanisms is selectively engageable to interconnect the first member of the second planetary gear set with at least one of the first member of the fourth planetary gear set and the input member.

3. The transmission of claim 2 wherein a second of the five torque transmitting mechanisms is selectively engageable to interconnect the first member of the second planetary gear set with at least one of the second member of the fourth planetary gear set and the output member.

4. The transmission of claim 3 wherein a third of the five torque transmitting mechanisms is selectively engageable to interconnect the first member of the third planetary gear set with at least one of the second member of the fourth planetary gear set and the output member.

5. The transmission of claim 4 wherein a fourth of the five torque transmitting mechanisms is selectively engageable to interconnect at least one of the second member of the first planetary gear set and the third member of the second planetary gear set with at least one of the second member of the second planetary gear set and the third member of the third planetary gear set.

6. The transmission of claim 5 wherein a fifth of the five torque transmitting mechanisms is selectively engageable to interconnect at least one of the second member of the second planetary gear set and the third member of the third planetary gear set with the stationary element.

7. The transmission of claim 1 wherein the first members are sun gears, the second members are carrier members, and the third members are ring gears.

8. The transmission of claim 1 wherein the input member is continuously interconnected with the first member of the fourth planetary gear set and wherein the output member is continuously interconnected with the second member of the fourth planetary gear set.

9. The transmission of claim 1 wherein one of the torque transmitting mechanisms is a brake and four of the torque transmitting mechanisms are clutches.

10. The transmission of claim 1 wherein the stationary element is a transmission housing.

11. A transmission comprising:
    an input member;
    an output member;
    first, second, third and fourth planetary gear sets each having first, second and third members, wherein the input member is continuously interconnected with the first member of the fourth planetary gear set and wherein the output member is continuously interconnected with the second member of the fourth planetary gear set;
    a first interconnecting member continuously interconnecting the first member of the first planetary gear set with a stationary element;
    a second interconnecting member continuously interconnecting the second member of the first planetary gear set with the third member of the second planetary gear set;
    a third interconnecting member continuously interconnecting the third member of the first planetary gear set with the second member of the third planetary gear set and the third member of the fourth planetary gear set;
    a fourth interconnecting member continuously interconnecting the second member of the second planetary gear set with the third member of the third planetary gear set;
    a first torque transmitting mechanism selectively engageable to interconnect the first member of the second planetary gear set with at least one of the first member of the fourth planetary gear set and the input member;
    a second torque transmitting mechanism selectively engageable to interconnect the first member of the second planetary gear set with the second member of the fourth planetary gear set and the output member;
    a third torque transmitting mechanism selectively engageable to interconnect the first member of the third planetary gear set with the second member of the fourth planetary gear set and the output member;

a fourth torque transmitting mechanism selectively engageable to interconnect at least one of the second member of the first planetary gear set and the third member of the second planetary gear set with at least one of the second member of the second planetary gear set and the third member of the third planetary gear set; and a fifth torque transmitting mechanism selectively engageable to interconnect at least one of the second member of the second planetary gear set and the third member of the third planetary gear set with the stationary element, and wherein the torque transmitting mechanisms are selectively engageable in combinations of at least two to establish at least eight forward speed ratios and at least one reverse speed ratio between the input member and the output member.

12. The transmission of claim 11 wherein the first members are sun gears, the second members are carrier members, and the third members are ring gears.

13. The transmission of claim 11 wherein the stationary element is a transmission housing.

14. A transmission comprising:

an input member;

an output member;

first, second, third and fourth planetary gear sets each having a sun gear, a carrier member and a ring gear, wherein the input member is continuously interconnected with the sun gear of the fourth planetary gear set and wherein the output member is continuously interconnected with the carrier member of the fourth planetary gear set;

a first interconnecting member continuously interconnecting the sun gear of the first planetary gear set with a stationary element;

a second interconnecting member continuously interconnecting the carrier member of the first planetary gear set with the ring gear of the second planetary gear set;

a third interconnecting member continuously interconnecting the ring gear of the first planetary gear set with the carrier member of the third planetary gear set and the ring gear of the fourth planetary gear set;

a fourth interconnecting member continuously interconnecting the carrier member of the second planetary gear set with the ring gear of the third planetary gear set;

a first torque transmitting mechanism selectively engageable to interconnect the sun gear of the second planetary gear set with at least one of the sun gear of the fourth planetary gear set and the input member;

a second torque transmitting mechanism selectively engageable to interconnect the sun gear of the second planetary gear set with the carrier member of the fourth planetary gear set and the output member;

a third torque transmitting mechanism selectively engageable to interconnect the sun gear of the third planetary gear set with the carrier member of the fourth planetary gear set and the output member;

a fourth torque transmitting mechanism selectively engageable to interconnect at least one of the carrier member of the first planetary gear set and the ring gear of the second planetary gear set with at least one of the carrier member of the second planetary gear set and the ring gear of the third planetary gear set; and a fifth torque transmitting mechanism selectively engageable to interconnect at least one of the carrier member of the second planetary gear set and the ring gear of the third planetary gear set with the stationary element, and wherein the torque transmitting mechanisms are selectively engageable in combinations of at least two to establish at least eight forward speed ratios and at least one reverse speed ratio between the input member and the output member.

15. The transmission of claim 14 wherein the stationary element is a transmission housing.

* * * * *